(12) United States Patent
Dragoni

(10) Patent No.: US 6,440,581 B1
(45) Date of Patent: Aug. 27, 2002

(54) PERFORMANCE WELDING BAR

(75) Inventor: Francesco Dragoni, Villa Cortese (IT)

(73) Assignee: Elba S.p.A., Magnago (IT)

( * ) Notice: Subject to any disclaimer, the term of this patent is extended or adjusted under 35 U.S.C. 154(b) by 21 days.

(21) Appl. No.: 09/667,451

(22) Filed: Sep. 22, 2000

(30) Foreign Application Priority Data

Sep. 29, 1999 (IT) .......................................... MI99A2024

(51) Int. Cl.[7] .......................... B29C 65/00; B29C 65/74; C22C 21/06; C22C 21/10
(52) U.S. Cl. ..................... 428/650; 428/457; 428/472.2; 420/541; 420/543; 420/545
(58) Field of Search ................. 428/650, 457, 428/472.2; 420/541, 543, 545

(56) References Cited

U.S. PATENT DOCUMENTS

| | | | |
|---|---|---|---|
| 2,290,025 A | | 7/1942 | Bonsack |
| 2,707,985 A | | 5/1955 | Binnall |
| 3,660,205 A | * | 5/1972 | Taylor |
| 4,761,197 A | | 8/1988 | William et al. |
| 4,848,065 A | * | 7/1989 | Bott |
| 5,571,370 A | | 11/1996 | Selberg et al. |
| 5,637,184 A | * | 6/1997 | Luoni |

FOREIGN PATENT DOCUMENTS

| | | | |
|---|---|---|---|
| EP | 0 445 684 | | 9/1991 |
| EP | 0 857 653 | | 8/1998 |
| EP | 868997 | * | 10/1998 |
| EP | 0 941 933 | | 9/1999 |
| EP | 1088647 | * | 4/2001 |
| EP | 1129970 | * | 9/2001 |

OTHER PUBLICATIONS

Research Disclosures, Kenneth Mason Publications, "Vertical Form Fill Seal Sealing Bar", May 1998, p. 510. Disclosed anonymously 40904.

* cited by examiner

*Primary Examiner*—Deborah Jones
*Assistant Examiner*—Jason Savage
(74) *Attorney, Agent, or Firm*—Hedman & Costigan, P.C.

(57) ABSTRACT

An improved performance welding bar placed in a welding machine for the welding of thermoplastic material of low and high density, suitable for both the lower welding bar (11) and the upper welding bar (12) among which bars (11, 12) the material is moved along by at least one pair of lower (14) and upper (15) supply rollers, placed on top of each other, the two welding bars (11, 12) moved backwards and forwards between themselves by a control group (20), wherein each welding bar (11, 12) is made from a magnesium-zinc aluminum alloy, within which the percentage of zinc to be found is between 5.0–6.5% and the percentage of magnesium to be found is between 2.0–3.0%. According to the invention the use of a magnesium zinc aluminum alloy is provided for, for a welding bar in a welding machine of thermoplastic material, wherein the bar is continually activated by a forward and/or backward movement with regards to a second similar welding bar.

7 Claims, 1 Drawing Sheet

PERFORMANCE WELDING BAR

Figure 2:
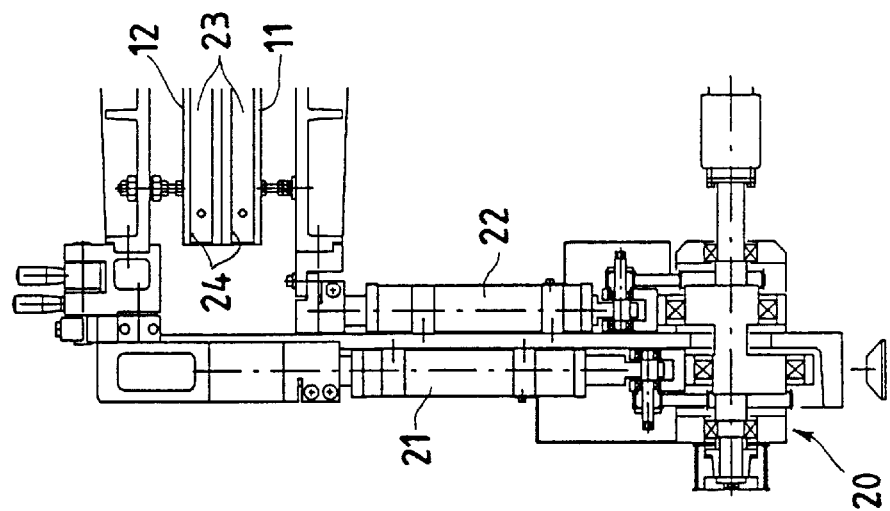

The present invention refers to an improved performance welding bar.

In machines used for the welding of thermoplastic material, such as those used for the production of bags welded at one end, so-called "open-mouth", or at both ends, made from a tubular plastic material or similar, transversal and/or longitudinal pairs of heated welding bars are used, simply called "welders".

The structures of these welders are presently made from cast iron as there is a need to have uniform heat along the entire bar and to have a specific weight which acts on the thermoplastic film of the entire area to be welded. Furthermore, the cast iron must be treated and smoothened in order to guarantee its superficial linearity.

However, it is to be taken into consideration that this kind of welder acts on the film according to a vertical backward and forward movement, biting it for a linear passsage, until it welds and cuts thanks to the presence of an interposed blade or even just thanks to the hot and sharpened welder in its striking area. The intervention of the two upper and lower bars is defined in practice as a "blow" or a "strike" and the present machines work well even up to around 200–250 blows or strikes per minute.

This means that the machine and the welding group work outstandingly when the working speed, or the advancement speed of the film to be welded and the so-called "blows", for example, for the production of bags, are within the limits indicated above.

In modern practice, the trend is to accelerate production more and more by increasing the number of blows and therefore the number of bags produced. A large quantity of blows leads to two types of problems: maintaining the temperature in the welding bars constant throughout the entire welding cycle for hours and hours and the remarkable mass of the welding bars to be moved quicker than before.

As is known, such bars are raised and lowered backwards and forwards between themselves thanks to the presence of complex control mechanisms, normally placed in the lower part of the machine of welding of thermoplastic materials.

As these mechanisms are also made up of toothed components they cannot undergo outstanding inertia (accelerations, shutdowns, turnarounds, accelerations etc) and be turned at high speeds otherwise they would wear out very quickly and would result in the breakage and shutdown of the machine.

Furthermore, in the present machines around the cast iron bar there is a teflon band or a similar antigluing material to avoid the thermoplastic material film from sticking to the cast iron welder, considering the temperature. This band must be rotated after a certain number of blows or welds as it is also subject to wear.

Furthermore, the presence of this band leads to appropriate supports of the same as well as a hooking device on each bar.

Box-shaped welding bars with a rectangular section made from a light alloy with chromium nickel straps on the end overlooking the other bar, are also already known. Each strap is heated up like a resistance and it determines the welding and the simultaneous cutting of the thermoplastic material being treated. Even in this case the presence of a teflon band must be provided for, or a similar antigluing material that twists around the bar and especially the chromium nickel strap to avoid that the thermoplastic film sticks to the heated chromium nickel strap itself that welds, considering the temperature.

Therefore an objective of the present invention is that of identifying a solution that allows for the most simple and most functional solution possible, even resolving the complex technical problem previously indicated and highlighted.

Another objective is that of creating a bar which solves all problems related to the high mass of the present iron cast bars, minimizing the mass and the members in movement, fully satisfying the function of having a correct temperature and a correct planarity of the work surfaces.

Another objective is that of avoiding any production faults whatsoever even at the high speeds at which the machine operates.

According to the present invention these and other objectives are achieved by providing an improved performance welding bar which is placed within a welding machine for the welding of thermoplastic material, suitable for each of the two lower (11) and upper (12) welding bars, among said bars (11, 12) said material is moved along by at least one pair of lower (14) and upper (15) supply rollers, placed on top of each other, said two welding bars (11, 12) being moved backward and forwards between themselves by a control group (20), wherein said welding bar (11, 12) is made from a magnesium-zinc aluminum alloy, the weight percent of zinc is 5.0–6.5% and the weight percent of magnesium is 2.0–3.0%.

Figure 1:
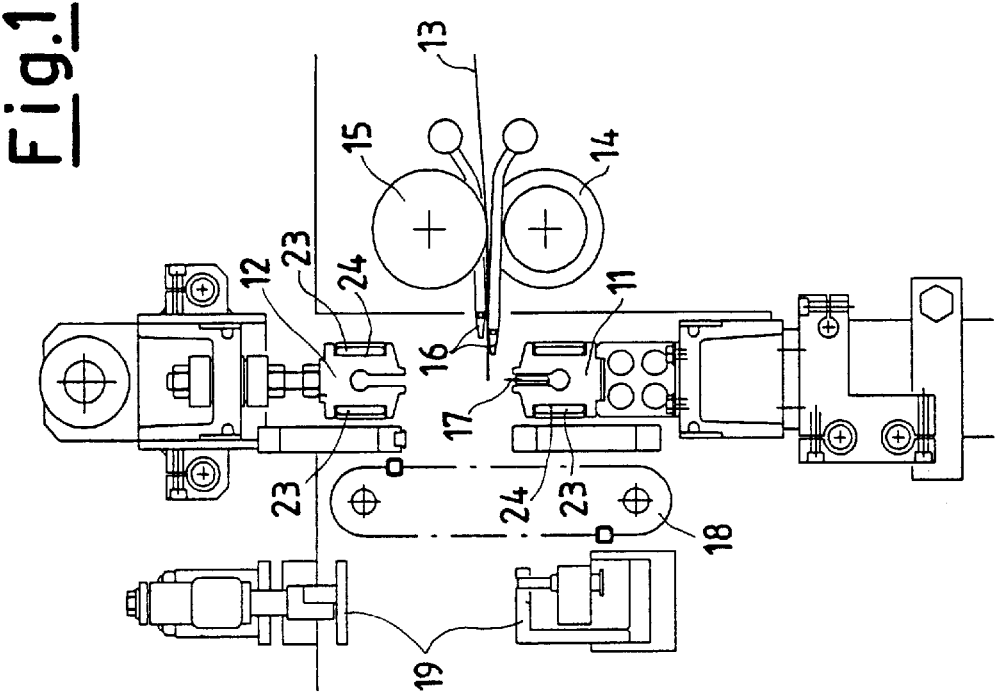

The functional and structural features and the advantages of an improved performance welding bar, according to the invention, will be explained in greater detail in the following description which refers to the layout drawings attached in which:

FIG. 1 illustrates a side elevation view of a welder tool assembled within a welding machine within which a pair of bars are assembled, according to the invention, and FIG. 2 partly illustrates a front view of the welder tool illustrated in FIG. 1.

With reference to the figures, a pair of lower 11 and upper 12 welding bars according to the invention are applied and assembled in the example onto a welding machine for the production of thermoplastic bags which are welded in low density and in high density.

Between the pair of welding bars 11 and 12 a film of tubular material or single-fold 13 is supplied, in a flattened form, aimed at the production of packets or bags. Furthermore, it is to be underlined that the structure of the welding machine is not important for this invention, as the new bars are built in such a way that they are able to be applied to any kind of machine, even a welding machine that already exists.

Film 13 is of a thermoplastic type and is moved along by at least one pair of lower 14 and upper 15 feeder rolls, which are placed on top of each other, to which nozzles 16 can be associated to enhance the advancement on a flat surface of the material being supplied.

The upper welder 12 and the lower welder 11 are fitted with a heating resistance 23 inserted between side casings 24. Furthermore, between the tips of at least one welder, generally the lower one 11, a cutting blade 17 is provided for, which works between the two welding lines created by the welders when they engage the one with the other.

Below the two welders 11 and 12 a device 18 may be provided for which moves the extremities of the bags, formed and welded, towards the bottom, as well as a pressure element 19 which facilitates the stacking of the bags (not illustrated) welded and sticking out of the two welders 11 and 12 onto a collection element (not illustrated).

FIG. 2 illustrates how the two welding bars 11 and 12 are moved backwards and forwards with respect to each other thanks to a control group 20 linked to them by side shafts 21 and 22, opportunely interconnected and synchronized with respect to each other. In the two FIGS. 1 and 2 it is possible to observe the two extreme positions of the welding group, that is to say with welding bars 11 and 12 open and far apart (FIG. 1) and with bars close together and committed between themselves to create at least one weld (FIG. 2).

According to the invention it is to be noted that no teflon band or similar antigluing material is provided for around the welding bar 11 or 12 and therefore no device for the winding and carrying of such teflon band or antigluing material.

According to the invention each bar 11 or 12 is made from an aluminum alloy, in particular of magnesium zinc, for example the one that is already well known with the name Ergal 7075.

In such an alloy the zinc percentage to be found is 5.0–6.5 while the percentage of magnesium to be found is 2.0–3.0. Preferably, the percentage of chromium to be found is 0.15–0.4 and the percentage of copper to be found is 1.0–2.5. Other components may then be found such as Si, Mn, Ti, etc. in small percentages and the remaining part is aluminum.

Such an aluminum alloy has good thermal conductivity (to 20° C. W/m.k in the status of T6 around 121), as well as a low specific weight (around 2.80 g/cm3). The alloy has a coefficient of linear expansion between 20 and 100° C. around $23 \times 10^{-6}$. Furthermore, it also has good resistance and is not so deformable.

According to the invention this alloy is very good at being submitted to a superficial anodic oxidation and therefore becomes resistant and not so deformable, superficially and linearly. In this way the relative lack of superficial hardness of the aluminum alloys is eliminated and there is a greater resistance even throughout longer periods.

Alternatively, the bar of the alloy indicated can be submitted to a nickelling system which provides on its treated surfaces a non-porous uniform deposit which is highly resistant to corrosion. A regular thickness of deposit is created, independent of the geometry of the parts upon which it deposits. Such procedures are known as the "Niploy Process".

With this magnesium-zinc aluminum alloy rather light extruded, laminated bars etc. can be created which maintain their linearity in order to guarantee correct welding when two pieces of it are placed together vertically, opportunely placed next to the welding heat (for example 170–230° C.).

It is to be noted, furthermore, that it is possible to weld the thermoplastic film without having any gluing problems with the aluminum alloy of the above-mentioned welders. These welders also have a perfectly smooth and continual surface, which often does not require any superficial treatment, for example if the bar is taken from an extrusion.

The welding temperature also contributes to improve the process, as it can be kept lower thanks to the fact that there is a direct heat transmission as the teflon band or similar material which is normally interposed is not necessary.

Furthermore, it is to be noted that the pressure applied during the closure of the welding bars 11 and 12 on top of each other is lower than before. This is because the teflon band is absent and the contact between the bars and the thermoplastic film is direct.

Therefore it is not necessary to heat the welding bars to a temperature which exceeds the melting temperature of the thermoplastic material because, according to the present invention, there is an immediate heat transmission on the material to be welded.

The magnesium-zinc aluminum alloy also allows for rapid heating of the bar with easy maintenance of the temperature required. Furthermore, even the cooling down process of the machine for any intervention required around the welding area can be carried out rapidly because the machine cools down quickly, on the contrary to what happens with the cast iron welding bars.

Such welding bars eliminate all weight problems with related inertia, therefore allowing the machine to operate at a much higher speed (blows or strikes) than the usual speed of cast iron welding bars.

In brief, the use of such a magnesium-zinc aluminum alloy in the welding bars, especially in extruded, laminated or similar bars resolves all of the technical problems previously highlighted.

What is claimed is:

1. An improved performance welding bar placed within a welding machine for the welding of thermoplastic material, suitable for each of the two lower (11) and upper (12) welding bars, among said bars (11, 12) said material is moved along by at least one pair of lower (14) and upper (15) supply rollers, placed on top of each other, said two welding bars (11, 12) being moved backward and forwards between themselves by a control group (20), wherein said welding bar (11, 12) is made from a magnesium-zinc aluminum alloy, the weight percent of zinc is 5.0–6.5% and the weight percent of magnesium is 2.0–3.0%.

2. An improved performance welding bar according to claim 1, wherein the magnesium-zinc aluminum alloy further comprises 0.15–0.4 weight percent of chromium.

3. An improved performance welding bar according to claim 1, wherein the magnesium-zinc aluminum alloy further comprises 1.0–2.5 weight percent of copper.

4. An improved performance welding bar according to claim 1, wherein the magnesium-zinc aluminum alloy further comprises at least one of the following components Si, Mn, and Ti, in an amount less than the amount of aluminum.

5. An improved performance welding bar according to claim 1, wherein said bar is submitted to a superficial anodic process.

6. A method of welding a thermoplastic material which comprises employing a magnesium-zinc aluminum alloy as a welding bar in a welding machine where said welding bar is continually activated with a forward and/or backward movement with respect to a second welding bar.

7. A method according to claim 6, wherein said first and second welding bars comprise a magnesium-zinc aluminum alloy, wherein the weight percent of zinc is 5.0–6.5%, the weight percent of magnesium is 2.0–3.0%, a weight percent of chromium is 0.15–0.4%, a weight percent of copper is 1.0–2.5% and at least one member of the group consisting of Si, Mn, and Ti, in an amount which is less than the amount of aluminum.

\* \* \* \* \*